United States Patent [19]

Kugler

[11] Patent Number: 4,724,288
[45] Date of Patent: Feb. 9, 1988

[54] SWITCHBOARD CELL FOR RECEIVING SWITCHGEAR MOVABLE BY POSITIONING DRIVE

[75] Inventor: Reinhard Kugler, Berlin, Fed. Rep. of Germany

[73] Assignee: Siemens Aktiengesellschaft, Münich, Fed. Rep. of Germany

[21] Appl. No.: 944,376

[22] Filed: Dec. 19, 1986

[30] Foreign Application Priority Data

Dec. 20, 1985 [DE] Fed. Rep. of Germany ....... 3545780

[51] Int. Cl.⁴ ............................................... H01H 9/20
[52] U.S. Cl. .................................................. 200/50 R
[58] Field of Search ............. 200/50 R, 50 A, 50 AA, 200/318–327; 361/331–345

[56] References Cited

U.S. PATENT DOCUMENTS

| | | | |
|---|---|---|---|
| 2,673,260 | 3/1954 | Lester et al. | 200/50 AA |
| 2,888,615 | 5/1959 | Tusing | 361/339 |
| 2,921,998 | 1/1960 | Pokorny et al. | 200/50 AA |
| 3,534,186 | 10/1970 | Meyer | 200/50 R |
| 3,783,209 | 1/1974 | Cleaveland et al. | 200/50 AA |
| 4,041,260 | 8/1977 | Swindler et al. | 200/50 A |
| 4,112,269 | 9/1978 | Nelson et al. | 200/50 AA |
| 4,419,549 | 12/1983 | Osborne | 200/50 A |

FOREIGN PATENT DOCUMENTS 1186532 2/1965 Fed. Rep. of Germany .
1222933 6/1960 France .
2010015 6/1979 United Kingdom .

Primary Examiner—J. R. Scott
Attorney, Agent, or Firm—Kenyon & Kenyon

[57] ABSTRACT

A safety device against movement of switchgear in a switchboard cell with the door of the switchboard cell open, comprises a latch which cooperates with the recesses of a guide rod, the front end of which carries a stop. The stop precedes the head piece on the operating side of a threaded spindle of a positioning drive for a switchgear and can, with the door of the switching installation closed, be displaced by a tool provided for operating the threaded spindle, until the tool comes into engagement with the head. If the door of the switchboard cell is not closed, the latch engages one of the recesses of the guide rod of the stop and thereby prevents engagement of the tool with the head of the threaded spindle.

6 Claims, 5 Drawing Figures

SWITCHBOARD CELL FOR RECEIVING SWITCHGEAR MOVABLE BY POSITIONING DRIVE

BACKGROUND OF THE INVENTION

The present invention relates to a switchboard cell for receiving switchgear movable by a positioning drive, with a door which closes the switchboard cell and having an opening for the passage of a tool provided for operating a threaded spindle of the adjustment drive.

A switchboard cell of this type has become known, for instance, from U.S. Pat. No. 4,112,269. Controlling such a switchboard cell may be dangerous to the user if no attention is paid to creating the prerequisites for a safe execution of the control action prior to certain such control actions.

SUMMARY OF THE INVENTION

In this connection it is an object of the present invention to prevent the motion of the switchgear by means of the adjustment drive if the door of the switchboard cell is open. Such a safety device is to be designed with purely mechanically and automatically acting means in order to avoid any dependence on auxiliary power.

The above and other objects of the present invention are achieved by a switchboard cell for accommodating switchgear which can be moved by a positioning drive, having a door which closes the switchboard cell and having an opening for the passage of a tool provided for operating a threaded spindle of the positioning drive, wherein the head piece of the threaded spindle on the operating side is associated with a stop which is guided movably in the direction of the longitudinal axis of the threaded spindle and can be blocked and released in dependence on the position of the door.

The stop prevents the tool from coming into engagement with the threaded spindle at all. This has advantages over blocking the threaded spindle since in this case, the attempt could be made to overcome the safety device by the use of force.

Blocking and release of the stop body in dependence on the position of the door requires the selection of part of the door travel and transforming it into a suitable motion of a latching member or the like. This can advantageously be accomplished by means of a flexible transmission member, the jacket of which is fixed in the vicinity of the door and a guiding element of the stop body in respective abutment and the core of which is movable by the door relative to the jacket. Transmission members of this type are known, for instance, as Bowden cables or cable releases. It is furthermore known to employ flexible transmission members of this type for tripping circuit breakers in dependence on the existence of a control unit (U.S. Pat. No. 4,041,260) or to block movable switching units against operation depending on the position (British Pat. No. 20 10 015).

The guiding element of the stop body can be designed as a guiding rod which is guided in two parallel cross pieces of the adjustment drive and has recesses associated with the positions of the switchgear provided within the switchboard cell for engagement of a latch which can be operated by the flexible transmission member. By the guidance at both cross pieces, the danger of jamming is avoided and at the same time a mechanical strength is obtained such that an attempt at unauthorized manipulation of the stop body can remain unsuccessful.

In this arrangement, the flexible transmission member can be inserted in such a way that the latch forms the abutment for the jacket of the transmission member and that a stationary stop is provided for the end of the core on the latch side, wherein the latch is pretensioned by a spring in the sense of an engagement of the latch with the guide rod. The release of the guide rod is accomplished here by action on the transmission member by the door. As soon as the door is opened, the force ceases and the latch engages the guide rod again under the influence of the spring.

The latch can be designed as a sheet metal latch angled off three times in the same sense, wherein one leg forms the abutment of the jacket of the transmission member; a leg parallel to this leg has an opening corresponding to the jacket of the transmission member; and a bottom piece arranged at right angles to these legs has an elongated hole for guiding the latch at a mounting baffle, as well as a latch post. The opening provided at a distance from the legs forming the abutment forms a protection for the jacket of the transmission member against damage and assures reliable operation of the device.

Near a frame part of the door of the switchboard cell, a plunger serving for action on the core of the transmission member can be supported at a holder, and the plunger and the holder can be designed as opposite each other, forming a wedge-shaped gap. The wedge-shaped gap permits defeating the safety device by means of a tool which has a corresponding wedge angle, so that, for instance, an authorized specialist can carry out work on the switchboard cell which requires opening the door with the circuit breaker in place. By suitable choice of the position of the wedge-shaped gap and its design, provision can be made such that to an unauthorized person, the possibility of defeating the safety device is not recognizable. Manipulation is further made more difficult by the fact that only tools with a certain wedge angle permit the defeating action.

In particular, the plunger can have a wedge inclination which starts at a stop projection and extends in the direction of the door-side end, and a leg of the holder extending parallel to the direction of the displacement of the plunger can be arranged beside the wedge inclination.

BRIEF DESCRIPTION OF THE DRAWINGS

The invention will be explained in greater detail in the following detailed description with reference to the drawings, in which:

FIG. 2 shows details of a latch serving for blocking the stop body shown in FIG. 1, while

DETAILED DESCRIPTION

Figure 1:
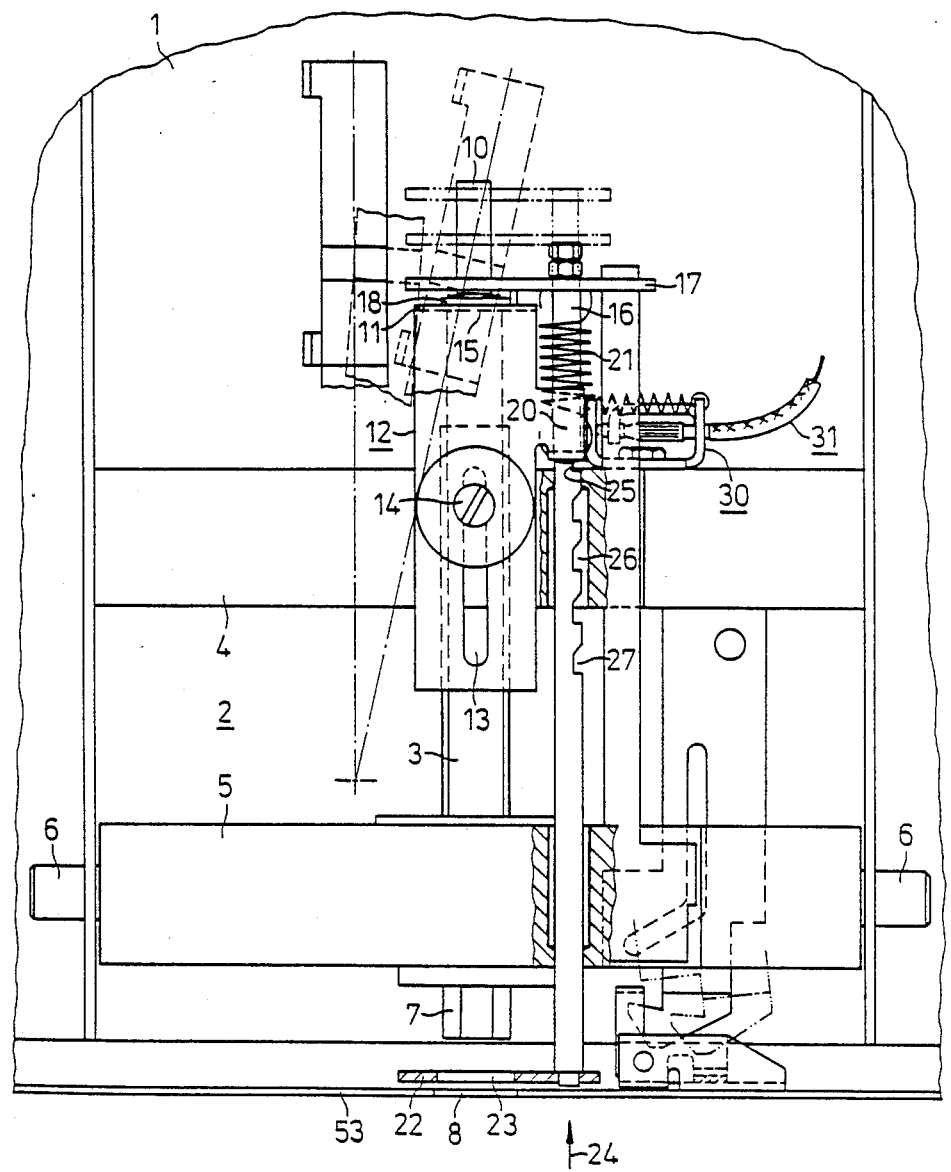
FIG. 1 shows in a top view onto the bottom plate of the switchboard cell or a pull-out frame for a switchboard cell, an adjustment drive with a stop body preceding a threaded spindle.

On the bottom plate 1 shown in FIG. 1 of a pull-out frame or a switchboard cell intended for receiving a switchgear, for instance, a low-voltage circuit breaker, there is a positioning drive which is designated as a whole with 2 and comprises a stationary cross piece 4 serving as the nut of a threaded spindle 3, as well as a movable cross piece 5 serving as the abutment of the threaded spindle 3. Driver pins 6 which are arranged extending beyond the cross piece 5 on both sides serve for coupling to suitable parts of the switchgear which can therefore be moved by rotating the threaded spindle 3. For operating the threaded spindle 3, a head piece 7 in the form of a hexagon is provided on the front side.

At the rearward end, i.e., the end opposite the head 7, the threaded spindle 3 is provided with a threadless end piece 10, over which an angled-off portion 11 of a follower slider 12 engages, which is guided by means of an elongated hole 13 at a post 14 which is inserted into the top side of the cross piece 4. Through contact of the angled off portion 11 with a shoulder 15 of the threaded spindle 3 formed by the threadless end piece 10 on the one hand and a disc 18 secured by a transfer pin on the other hand, provision is made that the threaded spindle 3 can turn freely and the follower slider 12 can be taken along in both directions in the process.

In the cross pieces 4 and 5, a guide rod 16 is movably guided in a position parallel to the threaded spindle 3. At its rear end, the guide rod 16 is provided with a cross piece 17 which extends parallel to the angled-off portion 11 of the follower slider 12. By a tension spring 21 engaging a cross piece 17 on the one hand and a lateral extension 20 of the follower slider 12 on the other hand, the guide rod 16 is pulled against the angled-off portion 11 of the follower slider 12 or the disc 18, respectively. This arrangement has the purpose to take the guide rod 16 along always in the same sense if the threaded spindle 3 is readjusted, so that the front end of the guide rod 16 is always at the same distance from the movable cross piece 5. At this end a stop 22 is fastened at the guide rod 16 and has an opening or cutout 23 fitting the head 7 of the threaded spindle 3. The guide rod 16 with the stop 22 is thereby movable in the direction of the arrow 24 by a tool until the latter comes into engagement with the head 7. If the tool is removed, the stop 22 returns into the position shown. In order to allow access to the head 7 for the tool, an opening 8 is provided in the door 53 of a switchboard cell.

The guide rod 16 is provided with five recesses which cooperate with a latch designated as a whole with 30 in such a way that a displacement of the guide rod 16 and thereby, an actuation of the threaded spindle 3 in dependence on the position of the door 53 can be prevented. Three of the recesses correspond to the operating position, the test position and the disconnect position, and are designated in this order with 25, 26 and 27. For blocking the actuation also in the intermediate positions of the pull-out frame, a further undesignated recess is provided between these recesses. Although six recesses are accordingly needed for three main positions and three intermediate positions, five recesses are sufficient in the embodiment shown on the basis of an accidental covering of two of the occurring positions.

Figure 2:
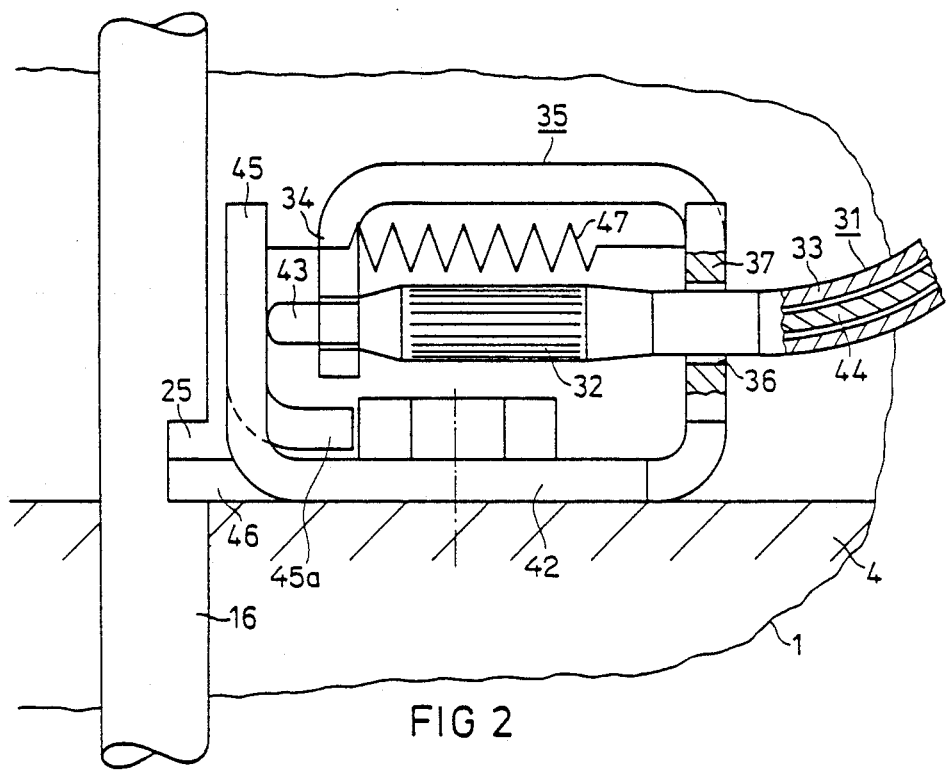
Figure 3:
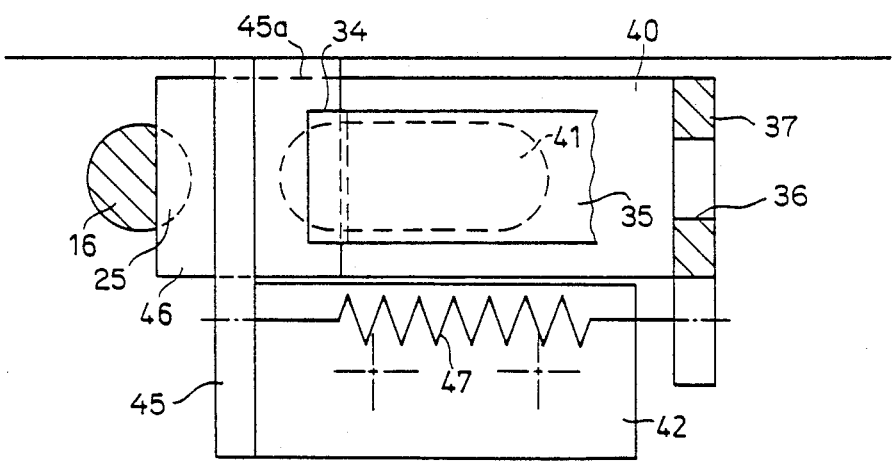
FIG. 3 shows the latch according to FIG. 2 in a view rotated 90°.

Details of the latch 30 will now be explained with the aid of FIGS. 2 and 3. In the latter, a magnified portion of the guide rod 16 with the recess 25 is shown. A threaded section 32 at the end of the jacket 33 of the transmission member 31 is inserted into a leg 34 which is parallel to the guide rod 16, of a sheet metal latch 35, where the jacket 33 extends through an opening 36 of a further leg 37, extending parallel to the leg 34, of the sheet metal latch 35. Thereby, the transmission member 33 is braced appropriately against lateral stresses. A bottom part 40 of the sheet metal latch 35 contains an elongated hole 41 for guidance in a sheet metal holder 42 further includes a latch projection 46. Serving as the stationary abutment for an end piece 43 of the core 44 of the transmission member 31 is an angled-off piece 45 of the sheet metal holder 42. A tension spring 47 insures pretensioning the sheet metal latch 35 in the sense of an engagement of the latch projection 46 with the recess 25 of the guide rod 16. Sheet metal holder 42 also includes a leg 45a which guides the lower leg portion 40 of the latch 35 to prevent it from moving upwardly due to the stresses caused by movement of flexible cable jacket 33.

The transmission member 31 is actuated by a door plunger 50 which is arranged in a holder 51 next to a frame part 52 of a door 53 of the switchboard cell. A further end section 32 corresponding to the end section 32 of the jacket 33 in FIG. 2 is fastened in the holder 51, while a plunger 43 rests against the core 44 at a working surface 54 of the door plunger 50. The door plunger 50 is additionally guided in an opening 55 of the frame part 52 and is designed with a rounded front end 56 for action by the door 53.

Figure 4:
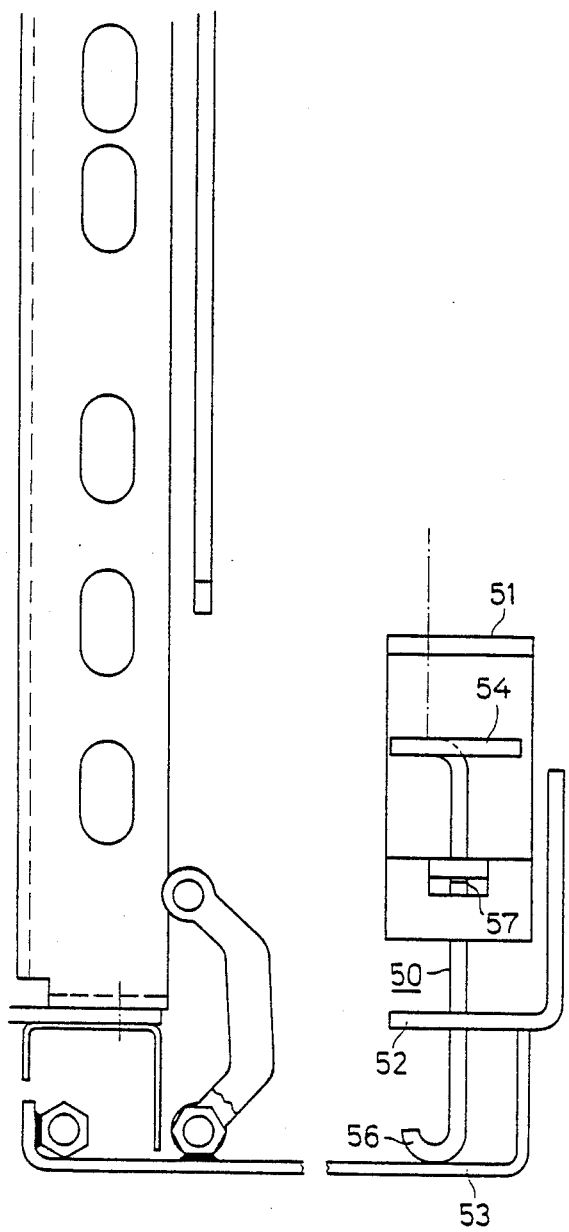
FIGS. 4 and 5 show respective views and sections at right angles to each other, of a device located near the frame of the door of the switchboard cell, for transmitting a motion on the latch shown in FIGS. 2 and 3.
Figure 5:
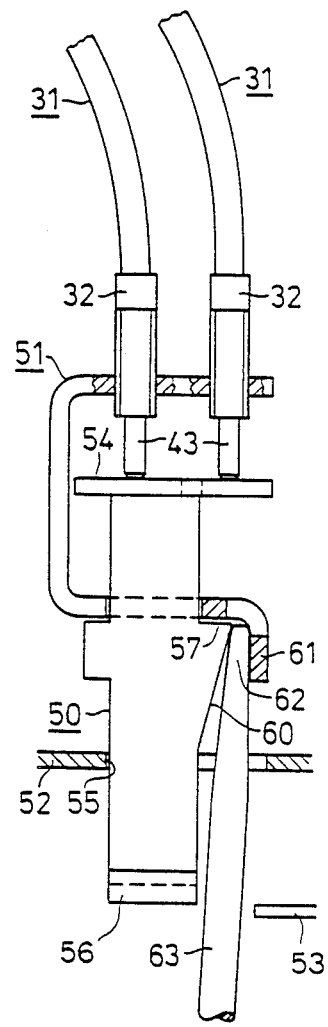

According to FIGS. 4 and 5, the door plunger 50 rests against the holder 51 with a stop projection 57. Starting from the projection 57, the door plunger 50 has a wedge inclination 60 extending parallel to the displacement direction of the door plunger 50 which is arranged at a small distance from the leg 61 of the holder 51. In this manner, the wedge-shaped gap 62 is formed which is provided for the temporary defeat of the safety device. To this end, FIG. 5 shows the bit 63 of a tool which is introduced between the wedge inclination 60 and the leg 61. Thereby, the door plunger 50 is held in the position shown, whereby the closed condition of the door 53 is simulated and the latch tab 46 is lifted out of the recess 25. (FIG. 2).

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A switchboard cell for accommodating switchgear responsive to a positioning drive, comprising a door which closes the switchboard cell and having an opening for the passage of a tool provided for operating a threaded spindle of the positioning drive, wherein a head piece of the threaded spindle on an operating side thereof is associated with a stop disposed in front of the threaded spindle, the stop being coupled to a guiding means and being guided movably by the guiding means in the direction of a longitudinal axis of the threaded spindle, and further comprising means in communication with the door and in communication with the guiding means for blocking and releasing the stop in dependence on the position of the door.

2. The switchboard cell recited in claim 1, wherein said means for blocking and releasing comprises flexible transmission means having a jacket and a movable core, the jacket being fixed in a region adjacent the door and further being fixed in a region adjacent the guiding means of the stop, the core being movable by the door relative to the jacket and further comprising latch means operatively coupled to said transmission means for engaging with said guiding means.

3. The switchboard cell recited in claim 2, wherein the guiding means of the stop comprises a guide rod guided in two parallel cross pieces of the positioning adjustment drive, the guide rod having recesses associated with respective positions of the switchgear within the switchboard cell for engagement with the latch means operated by said flexible transmission means.

4. The switchboard cell recited in claim 3, wherein the latch means forms a movable abutment for the jacket of the transmission means and a stationary stop is provided for the end of the core adjacent the latch means, the latch means being pretensioned relative to the guide rod by a spring which biases said latch means toward said guide rod.

5. The switchboard cell recited in claim 4, wherein the latch means comprises a sheet metal latch having a first leg, a second leg disposed at substantially a right angle with respect to said first leg, a third leg disposed substantially parallel to said first leg and extending in the same direction as said first leg, and a fourth leg disposed substantially parallel to said second leg and extending in the same direction as said second leg toward said guide rod, wherein said first leg forms the movable abutment of the jacket of the transmission means, the third leg parallel to said first leg has an opening for the jacket of the transmission means, said jacket being free with respect to said third leg, and the fourth leg has an elongated hole for guiding the latch in a sheet metal holder, and further comprising a latch projection extending from said fourth leg toward said guide rod.

6. The switchboard cell recited in claim 2, further comprising a door plunger biased against the core of the transmission means and being supported in a holder adjacent a frame part of the door of the switchboard cell, the holder having a leg disposed adjacent the plunger, the plunger having a wedge-shaped section disposed opposite said leg of the holder thereby to form a wedge-shaped gap between the leg and the plunger, a tool being insertable into said gap for holding said plunger against a stop member of the holder in a direction away from the door thereby to move the core of said flexible transmission means away from the door to move said latch means away from said guiding means even if said door is open, thereby allowing defeating of said latch means by personnel provided with said tool.

* * * * *